United States Patent [19]

Multrus

[11] Patent Number: 4,510,961
[45] Date of Patent: Apr. 16, 1985

[54] PNEUMATIC CONTROLLER

[75] Inventor: Vladimir Multrus, Limeshain, Fed. Rep. of Germany

[73] Assignee: Honeywell GmbH, Offenbach, Fed. Rep. of Germany

[21] Appl. No.: 491,000

[22] Filed: May 4, 1983

[30] Foreign Application Priority Data

May 14, 1982 [DE] Fed. Rep. of Germany ....... 3218230

[51] Int. Cl.$^3$ ............................................ G05D 16/00
[52] U.S. Cl. ..................................................... 137/86
[58] Field of Search ..................... 137/86, 85, 84, 82, 137/83

[56] References Cited

U.S. PATENT DOCUMENTS

| 3,020,490 | 2/1962 | Kleiss | 137/86 X |
| 3,387,619 | 6/1968 | Berger | 137/86 |
| 3,727,625 | 4/1973 | Nagumo | 137/86 |
| 4,094,463 | 6/1978 | Milewski | 137/86 |

*Primary Examiner*—Alan Cohan
*Attorney, Agent, or Firm*—Trevor B. Joike

[57] ABSTRACT

A pneumatic controller is disclosed having an automatic switching of its time behavior as a function of the control pressure by means of a relay being arranged in the integrating feedback path and being actuated by the control pressure. According to the invention, the relay connects the integrating feedback path to the atmospheric pressure when the control pressure attains an upper limit and/or to the supply pressure when the control pressure attains a lower limit.

8 Claims, 4 Drawing Figures

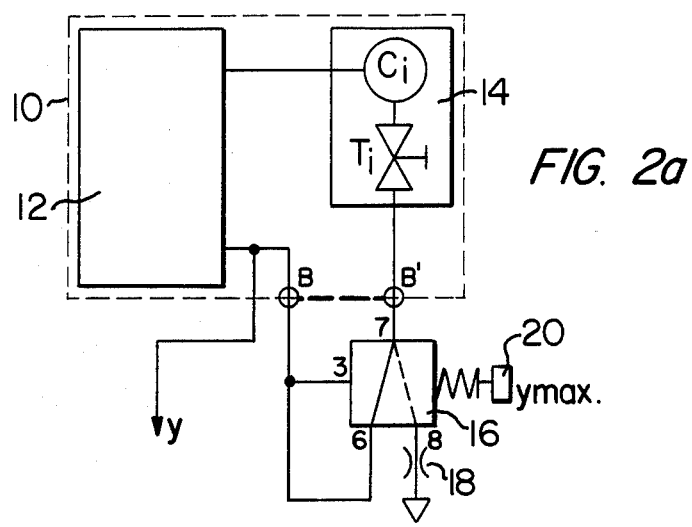
FIG. 2a
FIG. 2c
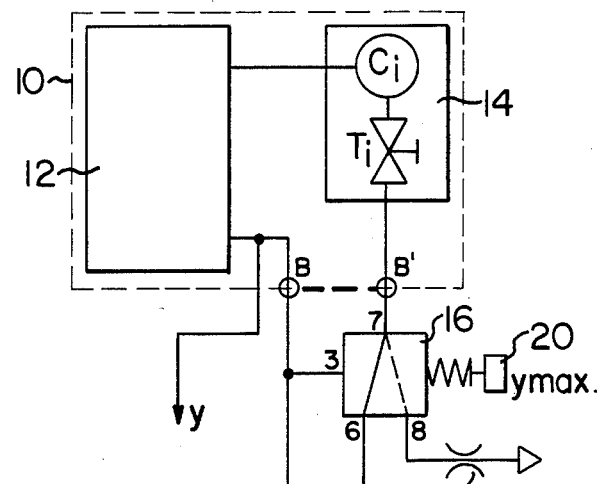
FIG. 2b
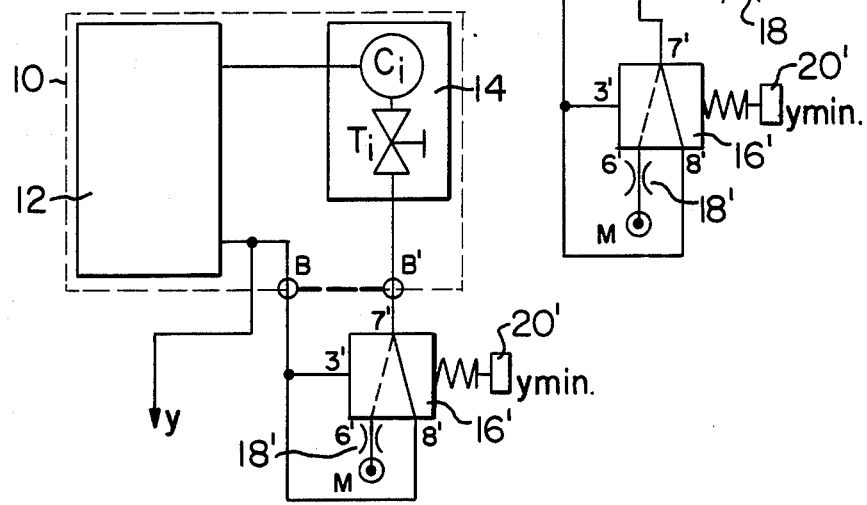

4,510,961

PNEUMATIC CONTROLLER

BACKGROUND OF THE INVENTION

The present invention relates to a pneumatic controller according to the preamble of claim 1. Such a pneumatic controller is known from German patent No. 22 11 765. A limit relay is provided in the integral feedback path in order to limit the control pressure to a desired limit pressure. Due to this operation, the following function results: in a batch process (with start-up) the measured value starts from zero in a known manner and accordingly, the control deviation is large and the control pressure larger than the pressure adjusted in the limit relay. During this start-up phase, the limit relay maintains the output pressure at a constant value, so that the controller comprises a fixed feedback, and therefore, a proportional behavior. If the control pressure falls below the pressure adjusted at the limit relay, the limit relay works as a 1:1 transducer, so that a time-delayed feedback, i.e. a controller with PI behavior, is achieved.

This known start-up circuit is relatively simple in design; however, it is only suitable for applications at which the output pressure leaves the control pressure range at its upper limit, since only a maximum limitation is provided. Furthermore, effectiveness of this start-up circuit is not optimum since the controller starts with a characteristic, the working point of which lies at the upper limit of the control pressure range. This leads to the effect that the control value will only leave a fixed value at a point where the measured value attains the desired value. Adjusting the limit relay in such a way that it is actuated by a control pressure which is lower than the maximum control pressure, is not recommended since then the normal PI behavior of the controller within the control range is handicapped.

Departing from this known pneumatic controller, it is, therefore, the object of the present invention to provide this controller with a start-up circuit being simpler and more effective.

SUMMARY OF THE INVENTION

Accordingly, the pneumatic controller of the present invention works in such a manner that when decreasing the controlled variable in a reverse-acting controller below the value, and when increasing the controlled variable in a direct-acting controller above the value, which value is determined by the proportional range, the integral feedback path is vented, so that the controller starts is operation with an optimum shifted characteristic. On the other hand, when increasing the controlled variable in a reverse-acting controller above the value, and when decreasing the controlled variable in a direct-acting controller below the value, which value is determined by the proportional range, the integral feedback path is connected to the supply air so that also in this event the controller starts its operation with an optimum shifted characteristic. Appropriately two switch relays are connected in series within the feedback path, wherein the one switch relay is actuated when reaching the upper control pressure limit in order to vent the feedback path and, wherein the other switch relay is actuated upon reaching the lower control pressure limit in order to connect the feedback path to the supply air. When inexpensive relays are used not having an exactly defined switching point, the feedback path is vented via a restriction, and the supply air is applied to the feedback path via a restriction, respectively.

BRIEF DESCRIPTION OF THE DRAWINGS

The invention shall be further explained with respect to embodiments shown in the figures of the attached drawing in which.

DETAILED DESCRIPTION

Figure 1:
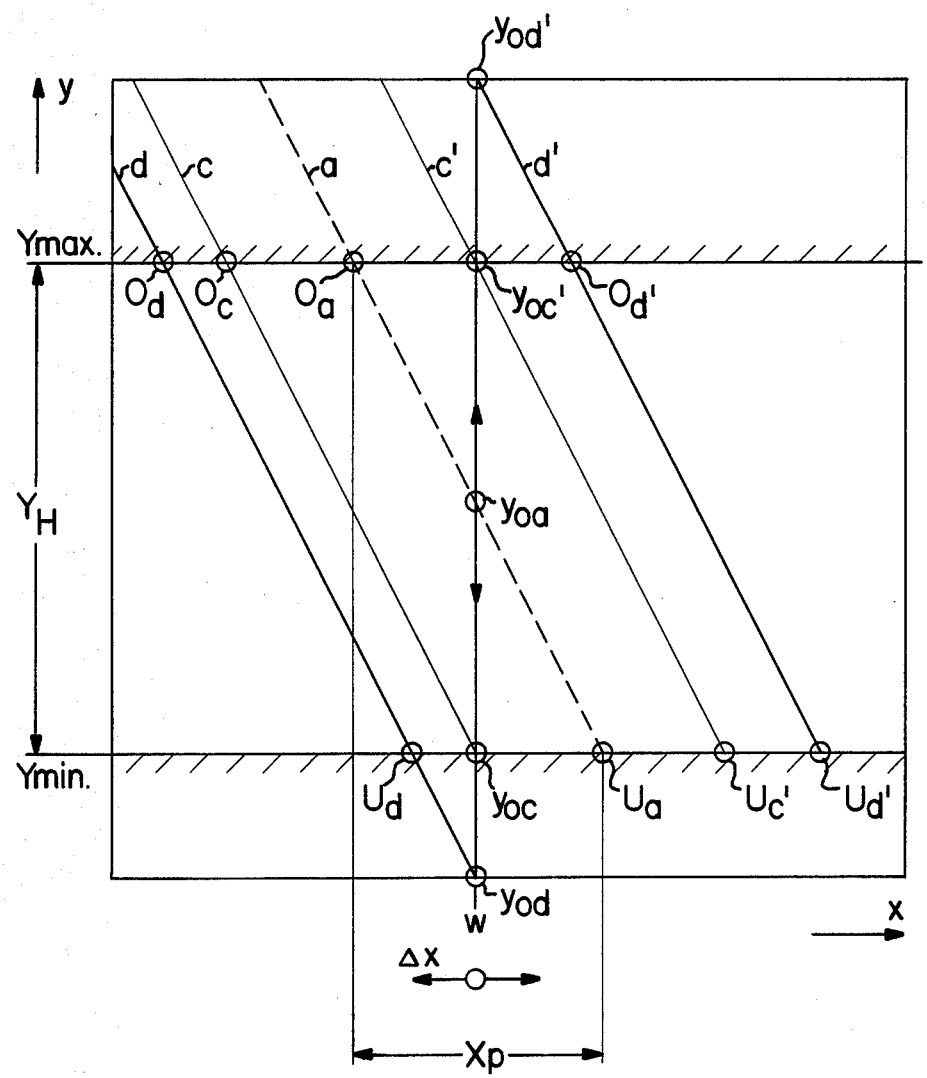
FIG. 1 shows characteristics of a pneumatic control element operated by a reverse-acting controller; and, FIGS. 2a to 2c show different start-up circuits of a pneumatic proportional/integral controller.

FIG. 1 shows a diagram for a control element where the output control pressure y is a function of the controlled variable x with the control element being operated by means of a reverse-acting controller. The control pressure range $y_H$ lies within a minimum value $y_{min}$ and a maximum value $y_{max}$, with those values being somewhat above the atmospherical pressure and somewhat below the supply pressure, respectively. The working point $y_{0a}$ of the controller usually is adjusted to the center of the control pressure range $y_H$ and the proportional range $x_p$ is symmetrical with respect to the given setpoint value w. The points where the controller leaves the proportional range at its upper and lower limit, respectively, are designated $O_a$ and $U_a$, respectively. With respect to the characteristics c, d and c', d', respectively, being shifted to the left and to the right, respectively, the same is true.

FIG. 2a shows a controller 10 comprising a proportional unit 12 and an integral unit 14 arranged in a feedback path. Within the feedback path in front of the integral unit 14, a switch relay 16 is provided. In one switching position the switch relay 16 connects the control pressure y at the input 6 to the output 7. In the other switching position the switch relay 16 connects the atmospherical pressure at the input 8 to the output 7. Herewith atmospheric pressure is applied to the input 8 via a restriction 18. A control input 3 also is connected to the control pressure y and by means of an adjusting knob 20 the upper limit $y_{max}$ with respect to the control pressure may be adjusted, at which limit the switch relay 16 vents the integral unit 14 to atmosphere.

FIG. 2b differs only by another wiring of the switch relay 16' and by an adjustment of the adjustment knob 20' in such a way that the switch relay 16' changes its shown switching position if the control pressure y falls below the lower limit pressure $y_{min}$. In opposition to FIG. 2a here the input 8' of the switch relay 16' is connected to the control pressure y, and the input 6' is connected to the supply air M via the restriction 18'.

According to FIG. 2c, both embodiments according to FIGS. 2a and 2b are combined within one circuit by applying the output 7' of the switch relay 16' to the input 6 of the switch relay 16. The remaining connections and the adjustment of the limit values with respect to the control pressure y are the same.

By means of a bridge B-B' both outputs of the controller 10 may be bridged so that the controller also may be operated without the automatic start-up circuit.

The operation of the above described start-up circit results from FIG. 1 as follows: if, in a reverse-acting controller, the controlled value x leaves the proportional range $x_p$ to the left side, i.e. the controlled pressure decreases, by exceeding the upper switch point $y_{max}$ by means of the control pressure y, the feedback path is vented to atmospheric pressure by means of the circuit according to FIG. 2a. Herewith the working point of the controller is shifted from $y_{0c}$ to $y_{0d}$ so that at its start-up, the controller starts with the maximum shifted characteristic d. Therefore, the controller already leaves the fixed value in an early state when reaching point $O_d$.

The same is true in the event where the controlled value x leaves the proportional range $x_p$ to the right side, i.e. the controlled pressure increases. In this case the integral feedback path according to FIG. 2b is connected to the supply air M if the control pressure y falls below the lower switching point $y_{min}$. Herewith the working point of the controller is shifted from $y_{0c}$ to $y_{0d}$, so the the controller also starts with a maximum shifted characteristic d'. In this manner the controller also leaves the fixed value in an early state at the point $U_{d'}$.

The embodiments of the invention in which an exclusive property or right is claimed are defined as follows:

1. A pneumatic controller having automatic switching of its time behavior as a function of a control pressure, said controller comprising:
   pneumatic controller means having an output for providing a control pressure in response to a controlled variable, said pneumatic controller means having a feedback input;
   pneumatic integrator means connected to said feedback input and having an integrator input for establishing an integrating feedback path between said integrator input and said feedback input; and,
   relay means connected to said pneumatic controller means output, to said integrator input and to atmosphere for normally connecting said integrator input to said pneumatic controller means output and for connecting said integrator input to atmosphere when said control pressure attains an upper limit.

2. The controller of claim 1 wherein said pneumatic integrator means includes a restriction for connecting said relay means to said feedback input.

3. A pneumatic controller having automatic switching of its time behavior as a function of a control pressure, said controller comprising:
   pneumatic controller means havng an output for providing a control pressure in response to a controlled variable, said pneumatic controller means having a feedback input;
   pneumatic integrator means connected to said feedback input and having an inegrator input for establishing an integrating feedback path between said integrator input and said feedback input; and,
   relay means connected to said pneumatic controller means output, to said integrator input, and to a supply pressure for normally connecting said integrator input to said penumatic controller means output and for connecting said integrator input to said supply pressure when said control pressure attains a lower limit.

4. The controller of claim 3 wherein said pneumatic integrator means includes a restriction for connecting said relay means to said feedback input.

5. A pneumatic controller having automatic switching of its time behavior as a function of a control pressure, said controller comprising:
   pneumatic controller means having an output for providing a control pressure in response to a controlled variable, said pneumatic controller means having a feedback input;
   pneumatic integrator means connected to said feedback input and having an integrator input for establishing an integrating feedback path between said integrator input and said feedback input; and,
   relay means connected to said integrator input, to said pneumatic controller means output, to atmosphere and to a supply pressure for normally connecting said pneumatic controller means output to said integrator input, to connect said integrator input to atmosphere when said control pressure attains an upper limit, and to connect said integrator input to supply pressure when said control pressure attains a lower limit.

6. The controller of claim 5 wherein said relay means comprises a first relay connected to be responsive to said control pressure and having an output connected to said integrator input, a first input connected to atmosphere and a second input, and a second relay connected to be responsive to said control pressure and having an output connected to said second input of said first relay, a first input connected to said pneumatic controller means output and a second input connected to supply pressure, said first relay responsive to said control pressure attaining said upper limit and said second relay responsive to said control pressure attaining said lower limit.

7. The controller of claim 5 wherein said pneumatic integrator means includes a restriction for connecting said relay means to said feedback input.

8. The controller of claim 7 wherein said relay means comprises a first relay connected to be responsive to said control pressure and having an output connected to said integrator input, a first input connected to atmosphere and a second input, and a second relay connected to be responsive to said control pressure and having an output connected to said second input of said first relay, a first input connected to said pneumatic controller means ouput and a second input connected to supply pressure, said first relay responsive to said control pressure attaining said upper limit and said second relay responsive to said control pressure attaining said lower limit.

* * * * *